(12) United States Patent
Riegger

(10) Patent No.: US 11,602,219 B2
(45) Date of Patent: Mar. 14, 2023

(54) LENGTH-ADJUSTABLE SUPPORT DEVICE

(71) Applicant: 90GRAD GMBH, Immenstaad (DE)

(72) Inventor: Mario Riegger, Immenstaad (DE)

(73) Assignee: 90GRAD GMBH, Immenstaad (DE)

( * ) Notice: Subject to any disclaimer, the term of this patent is extended or adjusted under 35 U.S.C. 154(b) by 224 days.

(21) Appl. No.: 16/760,319

(22) PCT Filed: Oct. 10, 2018

(86) PCT No.: PCT/EP2018/000467
§ 371 (c)(1),
(2) Date: Apr. 29, 2020

(87) PCT Pub. No.: WO2019/096433
PCT Pub. Date: May 23, 2019

(65) Prior Publication Data
US 2020/0337459 A1    Oct. 29, 2020

(30) Foreign Application Priority Data

Nov. 16, 2017   (DE) ...................... 10 2017 010 611.8

(51) Int. Cl.
*A47B 91/02* (2006.01)
*A47B 9/14* (2006.01)

(52) U.S. Cl.
CPC ............... *A47B 91/02* (2013.01); *A47B 9/14* (2013.01); *A47B 2009/145* (2013.01); *A47B 2200/002* (2013.01); *F16M 2200/028* (2013.01)

(58) Field of Classification Search
CPC ..... A47B 91/02; A47B 9/14; A47B 2009/145; A47B 2200/002; F16M 2200/028
(Continued)

(56) References Cited

U.S. PATENT DOCUMENTS

| 7,566,043 B2 * | 7/2009 | Chen ...................... G06F 1/1616 |
| | | 248/677 |
| 8,201,505 B2 * | 6/2012 | Long ....................... A47B 9/02 |
| | | 108/147 |

(Continued)

FOREIGN PATENT DOCUMENTS

| DE | 934 122 C | 10/1955 |
| DE | 94 07 987 U1 | 7/1994 |

(Continued)

OTHER PUBLICATIONS

International Search Report of PCT/EP2018/000467, dated Nov. 30, 2018 with English translation.

*Primary Examiner* — Daniel J Troy
*Assistant Examiner* — Timothy M Ayres
(74) *Attorney, Agent, or Firm* — Collard & Roe, P.C.

(57) ABSTRACT

A length-adjustable support device, comprising a first rod, a second rod, a bearing formed on the first rod for axially movably mounting the second rod on the first rod such that the second rod is movable in a translation motion relative to the first rod, and a movable fastening element for interlockingly axially fastening the movable second rod to the first rod by interlockingly fastening the fastening element to a mating interlocking-connection element, the mating interlocking-connection element for the interlocking connection to the fastening element. The aim of the invention is that the interlockingly locked length of the support device can be temporarily adjusted by changing the length of the support device.

17 Claims, 9 Drawing Sheets

(58) Field of Classification Search
USPC .................................................. 248/188.2
See application file for complete search history.

(56) References Cited

U.S. PATENT DOCUMENTS

| | | | | |
|---|---|---|---|---|
| 10,206,509 | B1* | 2/2019 | Liao | A47C 9/08 |
| 2006/0175512 | A1* | 8/2006 | She | F16M 11/28 |
| | | | | 248/354.1 |
| 2011/0239913 | A1* | 10/2011 | Chung | B25H 1/18 |
| | | | | 248/188.4 |

FOREIGN PATENT DOCUMENTS

| | | |
|---|---|---|
| DE | 195 11 176 A1 | 10/1996 |
| DE | 101 48 972 A1 | 4/2003 |
| EP | 0 165 190 A1 | 12/1985 |
| GB | 729857 A | 5/1955 |

* cited by examiner

LENGTH-ADJUSTABLE SUPPORT DEVICE

CROSS REFERENCE TO RELATED APPLICATIONS

This application is the National Stage of PCT/EP2018/000467 filed on Oct. 10, 2018, which claims priority under 35 U.S.C. § 119 of German Application No. 2017 010 611.8, filed on Nov. 16, 2017, the disclosures of which is incorporated by reference. The international application under PCT article 21(2) was not published in English.

The present invention relates to a length-adjustable support device according to the preamble of claim 1 and a table according to the preamble of claim 10.

Length-adjustable support devices can be used in various technical applications. Especially in the feet of tables, length-adjustable support devices allow the feet to be adjusted in length, so that the table has a different height.

DE 101 48 972 A1 shows a length-adjustable column as both a strut for foldable elements and a support for height-adjustable elements consisting of a first part and a second part telescopically guided in the first part, whereby in the second part at least one circumferential first groove is designed that in a cross-sectional plane in the first part at least three openings are made for the loose reception of one clamping body each, such that the dimensions of the first groove in the second part and the wall thickness of the first part are designed such that the clamping bodies in the first groove and the openings protrude above the surface of the first part that a clamping element with a circumferential formed second groove is guided on the first part and is coupled to the first part via a releasable interlocking and/or non-positive connection, whereby the second groove being designed such that the clamping body either by the clamping element is pressed in the first groove or the clamping bodies are completely and loosely in the openings and the second groove.

DE 94 07 987 U1 shows a height-adjustable table feet, with a standpipe, with a vertically displaceably guided lifting tube and with an adjusting device, which moves the lifting tube vertically against the standpipe, whereby the lifting tube is being guided through an inner guide tube, which engages coaxial into the standpipe and in the lifting tube, that the upper end of the standpipe and the lower end of the lifting tube engage axially in an adjusting sleeve, that the adjusting sleeve with an internal thread is vertically adjustable on an external thread of the standing tube or the lifting tube and that the adjusting sleeve is supported axially on the standpipe and axially supports the lifting tube.

DE 934 122 B shows a fitting for the releasable connection of the feet of tables to the frame of the table top, whereby a reinforcing plate, connected to the frame, is arranged between the frame and the foot and the reinforcing plate being wider than the foot.

The object of the present invention is therefore to provide a length-adjustable support device and a table in which the temporary interlockingly fixed length of the support device can be adjusted by changing the length of the support device.

This object is achieved by a length-adjustable support device and/or a length-adjustable column and/or a length-adjustable foot, comprising a first rod, a second rod, a bearing formed on the first rod for axially movably mounting the second rod on the first rod such that the second rod is movable in a translational motion relative to the first rod, a movable fastening element for interlockingly axially fastening the movable second rod to the first rod by interlockingly fastening the fastening element to a mating interlocking-connection element, the mating interlocking-connection element for the interlocking connection to the fastening element, whereby the length-adjustable support device comprises a mechanism and, because of the mechanism, an axial translation motion of the second rod causes an additional rotational motion of the second rod, the second rod thus being movable between a first rotational position and a second rotational position relative to the first rod by means of the axial translation motion of the second rod, the fastening element and the mating interlocking-connection element being in mechanical contact with each other in the first rotational position and the mechanical contact between the fastening element and the mating interlocking-connection element being released in the second rotational position. The mechanism enables rotational motion of the second rod relative to the first rod from the first rotational position to the second rotational position and vice versa from the second rotational position to the first rotational position by means of an axial translational motion of the second rod relative to the first rod. There is only mechanical contact between the fastening element and the mating interlocking-connection element in the first rotational position of the second rod, so that an interlocking connection between the mating interlocking-connection element and the fastening element is only possible in the first rotary position. A locking by means of a interlocking connection between the fastening element and the mating interlocking-connection element of the axial translational motion of the second rod relative to the first rod can thus only be carried out in the first rotational position and in the second rotational position no interlocking connection between the mating interlocking-connection locking element and the fastening element is possible, so that the second rod in the second rotational position is movable in all axial directions of motion relative to the first rod. A possible locking or unlocking of the axial motion of the second rod relative to the first rod can thus be controlled by means of the axial translation motion of the second rod relative to the first rod.

In an additional embodiment the geometry of the mating interlocking-connection element and/or the fastening element are designed such that, in the first rotational position of the second rod in a first direction of motion, the second rod is relative to the first rod axially movable as a translation motion and the axial translation motion of the second rod relative to the first rod is blocked and/or locked in a second direction of motion due to the interlocking connection between the fastening element and the mating interlocking-connection element, whereby the first direction of motion and the second direction of motion are opposite to each other. In the first rotational position of the second rod, the second rod is only axially movable in the first direction of motion relative to the first rod, so that the form-lockable length of the support device by means of an interlocking connection between the mating interlocking-connection element and the fastening element in the first rotational position of the second rod is workable.

In a supplementary embodiment the first direction of motion is a motion of the second rod out of the first rod, so that in the first direction of motion the length of the support device is increasable or vice versa and/or the bearing is designed as a slide bearing and/or the bearing is designed as an axial bore on the first rod.

In an additional embodiment the mechanism is formed by a guide element and a guide groove and the guide element is at least partially arranged in the guide groove.

Preferably the guide element is formed on the first rod and the guide groove is formed on the second rod or vice versa.

In a supplementary embodiment the guide element is designed as a pin or a ball. If the guide element is designed as a ball, only part of the ball is arranged in the guide groove and another part of the ball is in particular fixed to the first rod.

Suitable the fastening element is designed as a locking lug or a locking pin and/or the fastening element is pressed by an elastic element, in particular a spring, in direction to the mating interlocking-connection element. The elastic element presses the fastening element, in particular in the first rotational position of the second rod, in the radial direction outwards to the mating interlocking-connection element, so that a interlocking connection between the fastening element and the mating interlocking-connection element can thereby be carried out.

In a supplementary embodiment the fastening element is formed and/or fastened on the second rod and the mating interlocking-connection element is formed and/or fastened on the first rod, so that preferably the motion of the second rod is carried out together with the fastening element or the fastening element is formed and/or fastened on the first rod and the mating interlocking-connection element is formed and/or fastened on the second rod.

In an additional embodiment teeth are formed on the mating interlocking-connection element for the interlocking connection of the teeth to the fastening element, in particular the teeth are formed in the direction of the motion on a first side in the main perpendicular to the direction of motion of the second rod and are formed on a second side at an acute angle, in particular between 20° and 70°, to the direction of the motion and the first and second sides are opposite sides. The teeth are in particular formed in the direction of the motion on a first side in the main perpendicular to the direction of motion of the second rod, so that preferably the teeth are formed in the direction of the motion on a first side are designed with deviation of less an 30°, 20°, 10° or 5° perpendicular to the direction of motion of the second rod. Preferably the first and/or second sides of the teeth are in the main plain. Preferably the teeth are designed as locking elements.

Inventive table, comprising a table top, several table feet attached to the table top, whereby on at least one table foot, in particular on all table feet, a support device and/or column and/or foot as described in this IP application is formed for a length adjustment of the at least one table foot.

In a supplementary embodiment, the bearing and/or bore on the first rod is coaxial and/or concentric with the second rod.

In a further variant the length-adjustable support device comprises a mechanism and, because of the mechanism, the axial translation motion of the second rod causes an additional rotational motion of the second rod, the second rod thus being movable between a first rotational position and a second rotational position relative to the first rod by means of the axial translation motion of the second rod, the fastening element and the mating interlocking-connection element being in mechanical contact with each other in the first rotational position, so that the fastening element is interlockingly attached and/or is attachable to the mating interlocking-connection element and the mechanical contact between the fastening element and the mating interlocking-connection element being released in the second rotational position, so that the interlocking connection between the fastening element and the mating interlocking-connection element, in particular completely, is being released.

In a supplementary embodiment, the mechanism is designed such that, in the case of a translational motion in one direction of motion to increase the length of the support device, the second rod is movable as a rotational motion from the first rotational position into the second rotational position, in particular because of the arrangement of the guide element in a second connection section of the guide groove, and in the case of a translational motion in one direction of motion to reduce the length of the support device, the second rod is movable as a rotational motion from the second rotational position into the first rotational position, in particular because of the arrangement of the guide element in a first connection section of the guide groove.

In a supplementary embodiment, the mechanism is designed such that, in the case of a translational motion in one direction of motion to reduce the length of the support device, the second rod is movable as a rotational motion from the first rotational position into the second rotational position and in the case of a translational motion in one direction of motion to increase the length of the support device, the second rod is movable as a rotational motion from the second rotational position into the first rotational position.

In a supplementary embodiment, the mechanism is designed such that, in the case of a translation motion in the first direction of motion of the second rod, the second rod is movable from the first rotational position to the second rotational position as a rotational motion and in the case of a translation motion in the second direction of motion of the second rod, the second rod is movable from the second rotational position to the first rotational position as a rotational motion or vice versa, whereby the first and second directions of motion being oriented opposite to one another.

In a further variant, the fastening element is in the main formed on one side, in particular with a deviation of less than 30°, 20°, 10° or 5°, perpendicular to the direction of motion of the second rod, so that by means of the laying of the side of the fastening element on the first side of the teeth, the axial motion of the second rod relative to the first rod is blocked in one direction of motion, whereby the side of the fastening element preferably being in the main planar.

In an additional variant, a force is applied to the second rod by an axial elastic element, in particular an axial spring, for moving the second rod in one direction of motion to increase the length of the support device.

In a further embodiment, in the second rotational position the second rod is movable in the first and second direction of motion without a interlocking connection between the fastening element and the mating interlocking-connection element.

In a supplementary embodiment, the first and/or second connection section of the guide groove is oriented at an acute angle, in particular between 10° and 80°, to the direction of motion of the second rod, so that an axial translational motion of the second rod causes a rotational motion of the second rod.

In a further variant, the support device is in the main rod-shaped.

In a further embodiment, the rotational position of the second rod is a function of the axial translation position of the second rod.

Suitable to each one axial translation position of the second rod, one, in particular only one, rotational position of the second rod is assigned.

Suitable to each one axial translation position of the second rod, at least one, in particular only one, rotational position and/or or only two rotational positions of the second rod are assigned.

In an additional embodiment, the second rod is interlockingly fastened in different axial translation positions by means of the fastening element and the mating interlocking-connection element.

The support device, in particular the first and/or second rod and/or the fastening element and/or the mating interlocking-connection element, is preferably formed at least partially, in particular completely, of metal, in particular steel and/or aluminum, and/or of plastic.

Scaffold according to the invention with rods or supports, whereby the scaffold comprises at least one, preferably a plurality, support device or support devices described in this IP application.

Ladder according to the invention with two bars and rungs, whereby the ladder comprises at least one, preferably a plurality, support device or support devices described in this IP application, in particular in which the two bars each have a support device described in this IP application installed.

Furnishing item according to the invention, in particular a chair, bench or cupboard, with feet, whereby the furnishing item comprises at least one, preferably a plurality, support device or support devices described in this IP application.

Stand according to the invention for a two-wheeler, in particular a bicycle or motorcycle, whereby the stand comprises at least one, preferably a plurality. support device or support devices described in this IP application.

Two-wheeled vehicle according to the invention, in particular a bicycle or motorcycle, with a stand, whereby the stand comprises at least one, preferably a plurality, support device or support devices described in this IP application.

Seat tube according to the invention for a two-wheeled vehicle, whereby the seat tube comprises at least one, preferably a plurality, support device or support devices described in this IP application.

Stand according to the invention for a machine, dishwasher or washing machine, whereby the stand comprises at least one, preferably a plurality, support device or support devices described in this IP application.

Machine, dishwasher or washing machine according to the invention, whereby the machine, dishwasher or washing machine comprises at least one, preferably a plurality, support device or support devices described in this IP application.

Tripod according to the invention for a camera, whereby the tripod comprises at least one, preferably a plurality, support device or support devices described in this IP application.

An embodiment of the invention is described in more detail below with reference to the accompanying drawings.

It shows:

Figure 1:
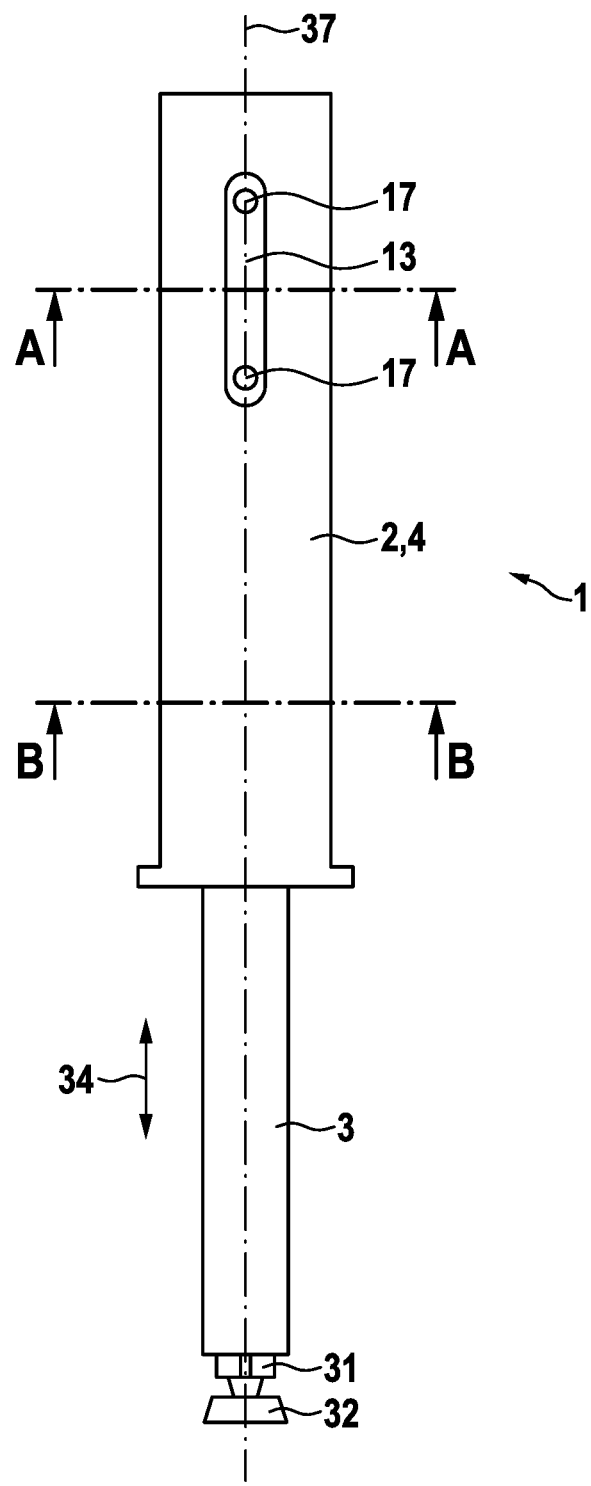
FIG. 1 is a front view of a support device.
Figure 2:
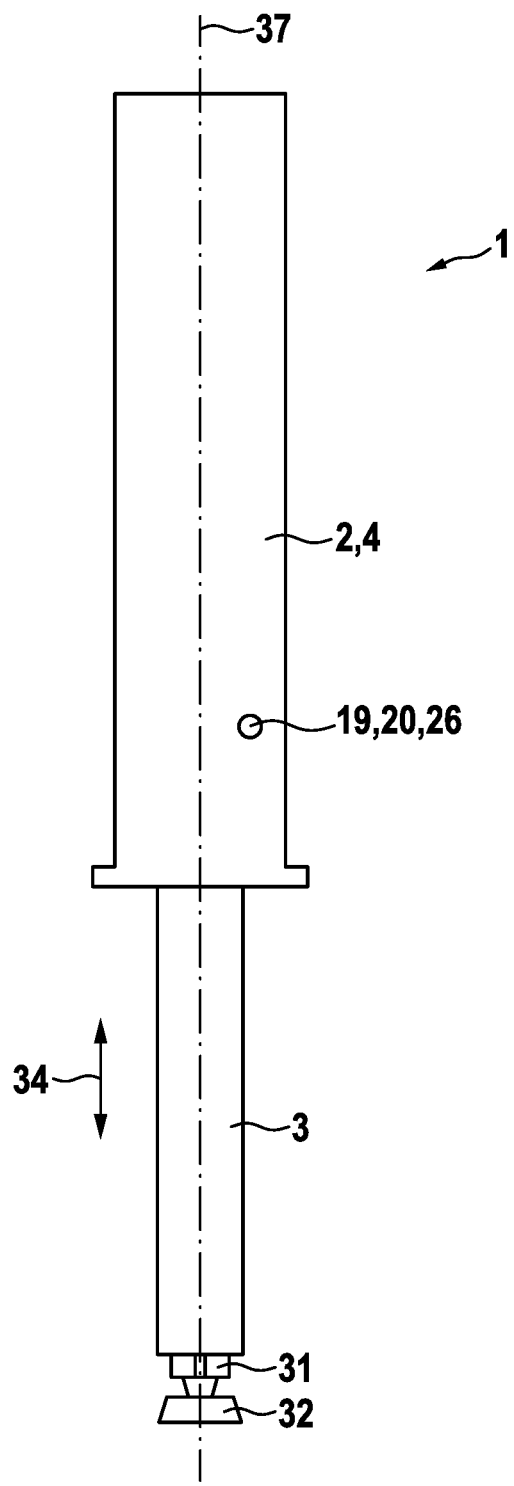
FIG. 2 is a rear view of the support device.
Figure 3:
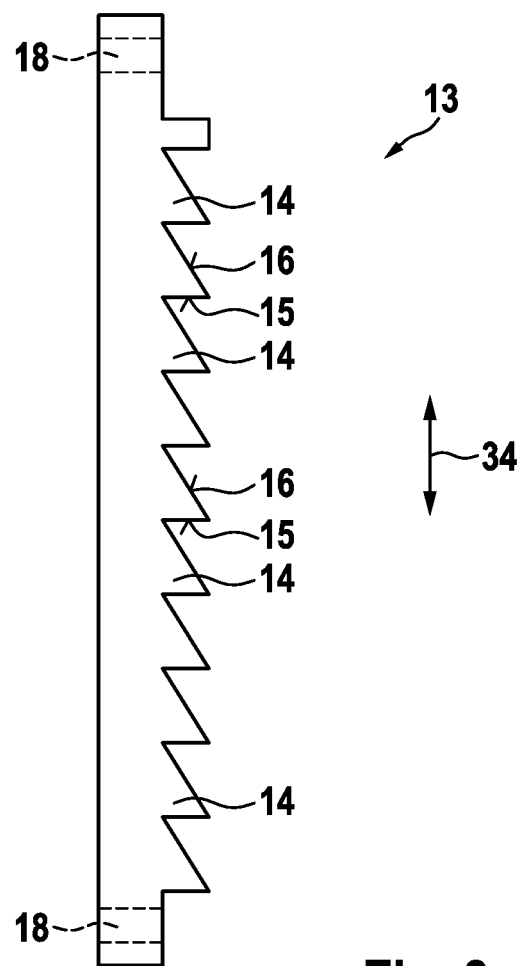
FIG. 3 shows a side view of a mating interlocking-connection element.
Figure 10:
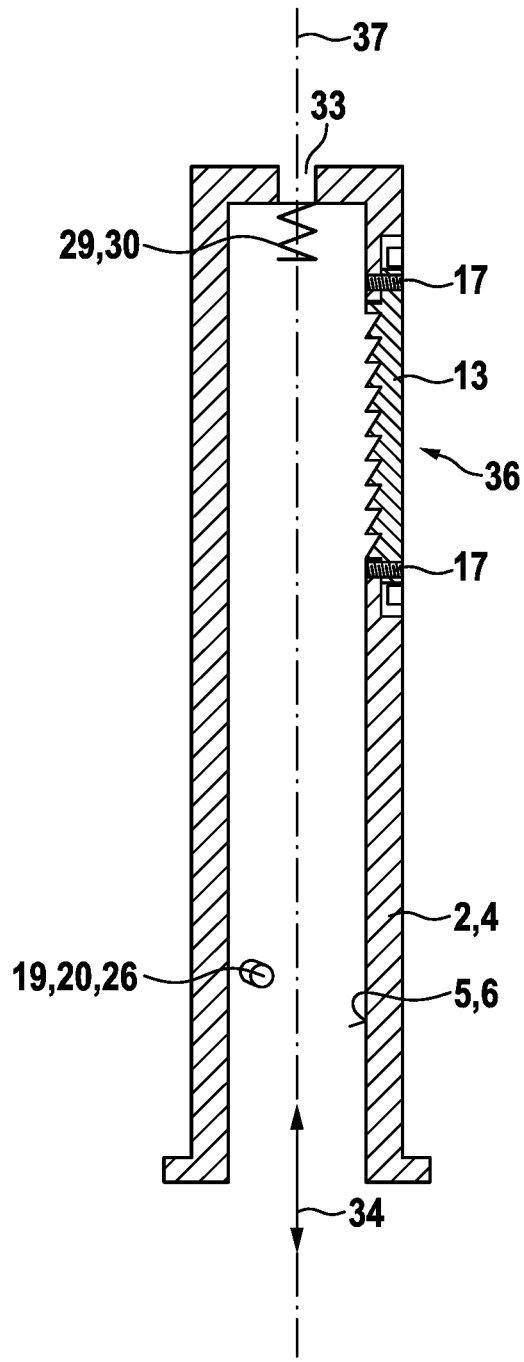
FIG. 10 is a longitudinal section of the first rod without the second rod.

A length-adjustable support device 1 and/or length-adjustable column 1 and/or length-adjustable foot 1 comprises a first rod 2 and a second rod 3. The first rod 2 is designed as a sleeve 4 with an in the main centrically designed bore 5, which forms a bearing 6 for the first rod 2. A longitudinal slot 36 is formed in the first rod 2 in an axial direction (FIG. 10). An elongated mating interlocking-connection element 13 is fastened in the longitudinal slot 36 (FIG. 3). The mating interlocking-connection element 13 has two bores 18 and by means of two fastening screws 17 in bores with an internal thread on the first rod 2 and in the bores 18 on the mating interlocking-connection element 13, the mating interlocking-connection element 13 is detachably fastened to the first rod 2. The mating interlocking-connection element 13 has a plurality of teeth 14 as locking elements 14. The teeth 14 have a first side 15 and a second side 16, each in a direction of motion 34 of the second rod 3 relative to the first rod 2. The first side 15 is oriented in the main perpendicular to the direction of motion 34 and the second side 16 is oriented at an acute angle of approximately 45° to the direction of motion 34 or a longitudinal axis 37 of the first and second rod 2, 3. The teeth 14 of the mating interlocking-connection element 13 are aligned in the radial direction to the bore 5 of the first rod 2, but the minimum radial distance of the radial ends of the teeth 14 from the central longitudinal axis 37 is greater than the radial distance of the bore or the inner wall of the bore 5 of the first rod 2 to the longitudinal axis 37.

A guide element 20 is additionally fastened to the first rod 2 as a guide pin 26. The guide pin 26 has an external thread 27 and the external thread 27 is screwed into an internal thread on a bore, in particular a radial bore, on the first rod 2 with an internal thread, and the guide pin 26 projects into the bore 5, that is to say the radial end of the guide pin 26 has a smaller radial distance from the central longitudinal axis 37 than the radial distance of the bore 5 of the first rod 2 from the longitudinal axis 37.

Figure 5:
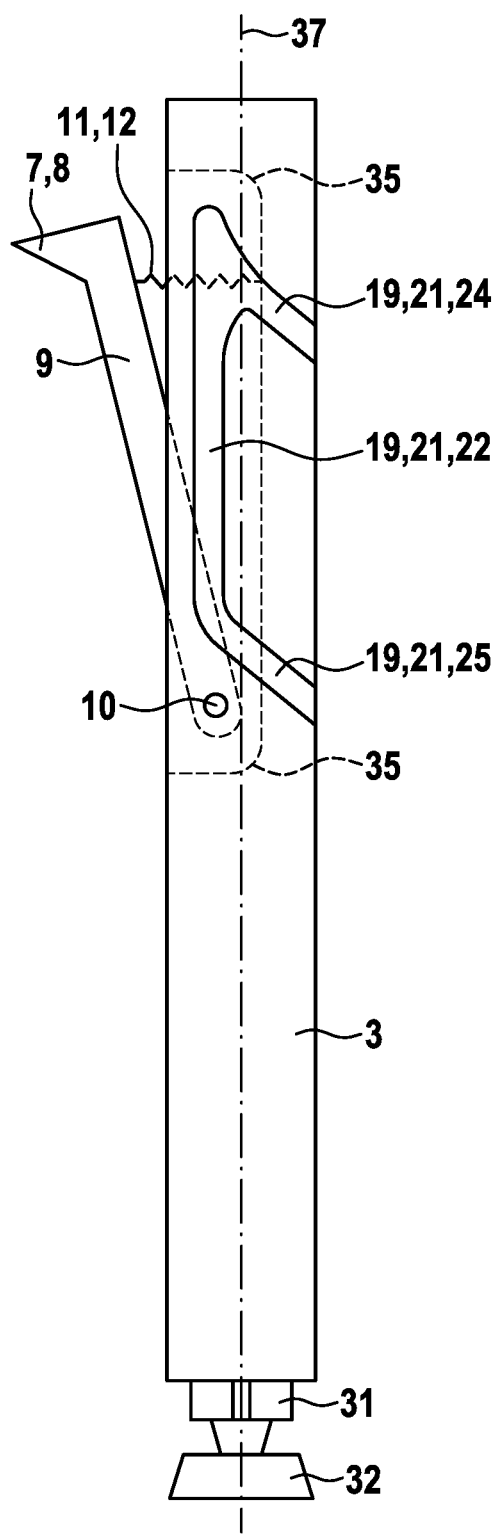
FIG. 5 shows a first side view of a second rod of the support device.

At a lower end, the second rod 3 has an axial bore, not shown, with an internal thread, and a screw with a nut 31 is screwed into this axial bore. A mounting element is additionally arranged on the nut 31 with the screw, and a bottom element 32 is pivotably attached to the mounting element for resting on the floor. The floor element 32 can be pivoted relative to the nut 31 to adapt to a floor. In the second rod 3, a recess 35 is machined in the axial direction and in the recess 35, a locking lever 9 is pivotally attached. The locking lever 9 is mounted by means of a bearing pin 10 pivotable about a pivot axis relative to the second rod 3. At an end region of the locking lever 9 facing away from the bearing pin 10, a fastening element 7 is designed as a locking lug 8. When the locking lever 9 is arranged in the main in the recess 35, one side of the fastening element 7 is oriented in the main perpendicular to the longitudinal axis 37 or the direction of motion 34, and another opposite side of the fastening element 7 is in the main aligned at an angle of 45° to that direction of motion 34 and the longitudinal axis 37 (FIG. 5).

One end of an elastic element 11 is fastened to the recess 35 of the second rod 3 and another end of the elastic element 11 is fastened to the locking lever 9. The elastic element 11 is designed as a spring and applies a force to the locking lever 9 in the radial direction, so that the fastening element 7 is pressed in the radial direction outward away from the central longitudinal axis 37 in the direction to the first rod 2.

Figure 6:
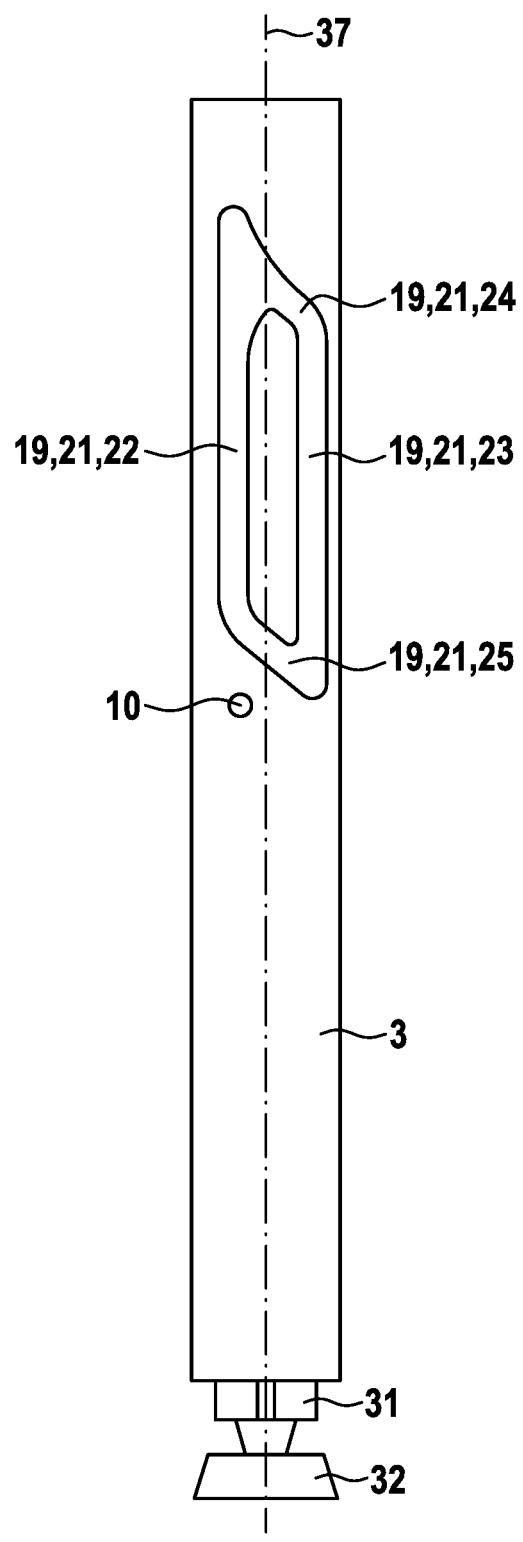
FIG. 6 shows a second side view of the second rod of the support device.
Figure 7:
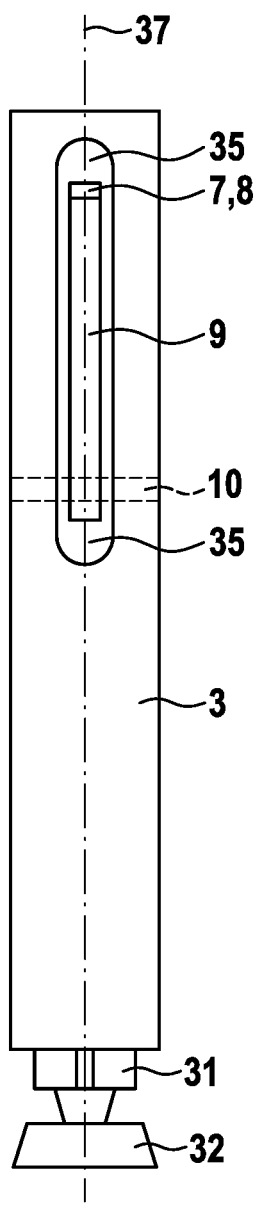
FIG. 7 is a third side view of the second rod of the support device.

The radial outside of the second rod 3, which is in the main in form of a cylinder jacket, serves as a slide bearing for bearing on the bore 5 of the first rod 2. A guide groove 21 is additionally machined in the radial outside of the second rod 3. The guide groove 21 (FIG. 6) has two axial sections, namely a first axial section 22 and a second axial section 23. The first and second axial section 22, 23 are connected in a larger section to the nut 21 with a first connection section 24 to one another and at an end of the first and second axial section 22, 23 facing to the nut 31, the first and second axial section 22, 23 are connected to one another by a second connection section 25.

The second rod 3 is at least partially supported in the bore 5 of the first rod 2 and is movable in the axial direction in a direction of motion 34 parallel to the central longitudinal axis 37. The longitudinal axis 37 forms both a longitudinal axis 37 for the first rod 2 and for the second rod 3. The guide element 20 is arranged in the guide groove 21. The guide element 20 and the guide groove 21, in particular due to the geometry of the guide groove 21, form a mechanism 19 such that an axial translational motion of the second rod 3 relative to the first rod 2 in the bore 5 causes a rotational motion of the second rod 3 relative to the first rod 2 between a first rotational position and a second rotational position. In the first rotational position of the second rod 3, the teeth 14 of the mating interlocking-connection element 13 are aligned with the fastening element 7 of the locking lever 9, so that in the first rotary position there is in mechanical contact between the fastening element 7 and the teeth 14 of the mating interlocking-connection element 13, because the fastening element 7 is pressed by the elastic element 11 towards the teeth 14. In the first rotational position of the second rod 3 relative to the first rod 2, an interlocking connection between the teeth 14 of the mating interlocking-connection element 13 and the fastening element 7 can thus be carried out for the interlocking fixation of the second rod 3 on the first rod 2 in the axial direction.

In the first rotational position of the second rod 3, the guide element 20 is located in the second axial section 23 of the guide groove 21. In the second rotational position of the second rod 3 relative to the first rod 2, the guide element 20 is located in the first axial section 22 of the guide groove 21. With a maximum length of the support device 1, that is to say with the maximum arrangement of the second rod 3 outside the first rod 2, the guide element 20 is in the uppermost possible position of the guide groove 21 shown in FIG. 6. With a axial translation motion of the second rod 3 (in the second rotational position of the second rod 3 and starting from the maximum length of the support device 1) into the first rod 2, the guide element 20 thus moves in the first axial section 22 towards the second connection section 25 of the guide groove 21. After reaching the end of the first axial section 22 of the guide groove 21, the guide element 20 comes out of the first axial section 22 into the inclined second connection section 25, so that due to the guide of the guide element 20 in the second connection section 25, the second rod 3 is moved from the second rotational position to the first rotational position. With a minimum length of the support device 1, that is to say with the maximum arrangement of the second rod 3 in the first rod 2, the guide element 20 is located at the lowest possible position of the guide groove 21 shown in FIG. 6 at the end of the second connection section 25 and the at beginning of the second axial section 23.

Figure 8:
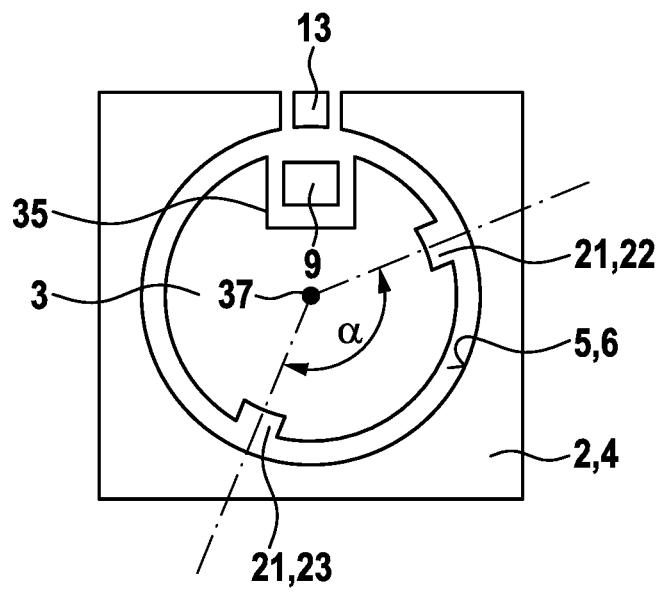
FIG. 8 shows a section A-A of the support device according to FIG. 1.
Figure 9:
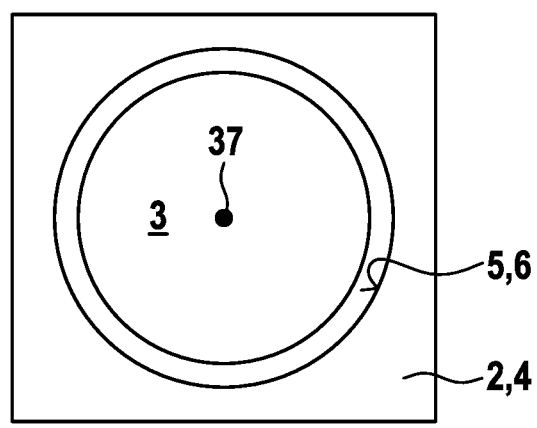
FIG. 9 shows a section B-B of the support device according to FIG. 1.

The first and second rotational position have an angle α of approximately 120° to one another, which corresponds to the angle α between the first and second axial section 22, 23 of the guide groove 21 (FIG. 8). After the first rotational position has been reached, the fastening element 7 thus comes into mechanical contact with the teeth 14 of the mating interlocking-connection element 13. An axial elastic element 29 as an axial spring 30 is arranged in the bore 5 between the axial end of the second rod 3 and the first rod 2. The axial spring 30 applies an axial compressive force in the direction of the motion direction 34 and/or the longitudinal axis 37 to the first rod 2, so that by the axial compressive force applied to the second rod 3 by the axial spring 30 the second rod 3 is pressed out of the bore 5 in order to increase the length of the support device 1.

To increase the length of the support device 1 (in the first rotational position of the second rod 3), the second rod 3 is thus moved out of the bore 5 of the first rod 2 by the axial spring 30 and this motion is possible, because the geometry of the teeth 14 and of the fastening element 7 enables this first direction of motion of the second rod 3 out of the first rod 2 in order to increase the length of the support device 1. A reverse direction of motion of the second rod 3 relative to the first rod 2, that is to say a second direction of motion opposite to the first direction of motion in order to reduce the length of the support device 1, that is to say a motion of the second rod 3 into the bore 5 of the first rod 2 is blocked in the first rotational position of the second rod 3 by the fastening elements 7 and the teeth of the mating interlocking-connection element 13, because the first sides 15 of the teeth 14 lie on the side of the fastening element 7, which is oriented in the main perpendicular to the longitudinal axis 37. A return motion of the third rod 3 into the second rod 2 to reduce the length of the support device 1 is thus excluded in the first rotational position of the second rod 3.

With a further motion of the second rod 3 out of the first rod 2 and an increase in the length of the support device 1 in the first rotational position of the second rod 3, the guide element 20 moves to the end of the second axial section 23 of the guide groove 21 and further in into the first connection section 24 of the guide groove 21. When the guide element 20 is arranged in the first connection section 24, the axial motion of the second rod 3 causes the second rod 3 to rotate from the first rotational position to the second rotational position. This axial translational motion and the rotational motion of the second rod 3 therefore causes that the mechanical contact between the teeth 14 and the fastening element 7 is eliminated. The translational motion at an end region with a in the main maximum length of the support device 1 thus causes, due to the first connection section 24, a rotation motion of the second rod 3, so that the second rod 3 is moved from the first rotational position to the second rotational position and thereby the second rod 3 again can be moved from the translation position with the maximum length of the support device 1 back into the first rod 2 as an axial translation motion (in the second rotational position of the second rod 3) in order to reduce the length of the support device 1 to a translation position with a minimum length of the support device 1. Shortly before reaching the translation position of the second rod 3 relative to the first rod 2 with the maximum length of the support device 1, the guide element 20 thus enters the second connection section 25, which causes the rotational motion of the second rod 3 from the second rotational position to the first rotational position. Shortly before reaching the translation position of the second rod 3 with the minimum length of the support device 1, the guide element 20 thus enters the second connection section 25 of the guide groove 21 and this causes the rotational motion of the second rod 3 relative to the first rod 2 from the second rotational position the first rotation position. The guide element 20 thus moves according to FIG. 6 counterclockwise in the guide groove 21.

Figure 4:
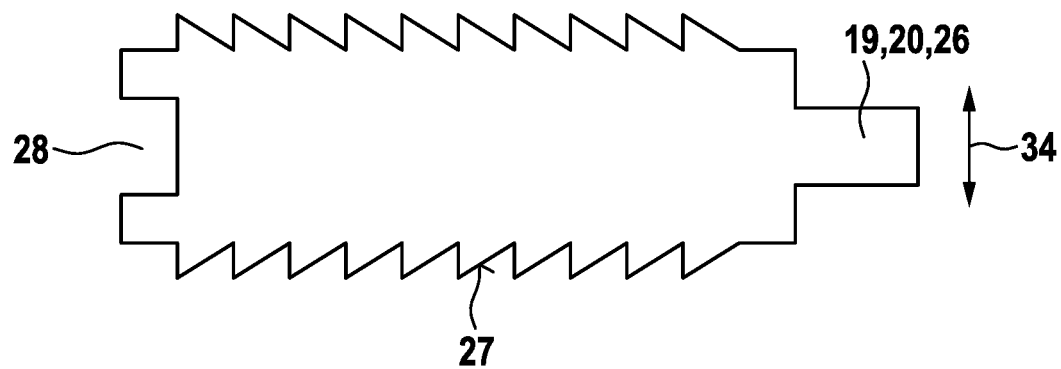
FIG. 4 is a side view of a guide element.

The guide element 20 has an external thread 27 and an opening 28 for an Allen key (FIG. 4). The external thread 27 of the guide element 20 is screwed into an internal thread of a bore on the first rod 2. An axial bore 33 with an internal thread is also formed on the first rod 2. The axial bore 33 serves to fasten the support device 1 to other components, for example a table foot 39 of a table 40.

Figure 11:
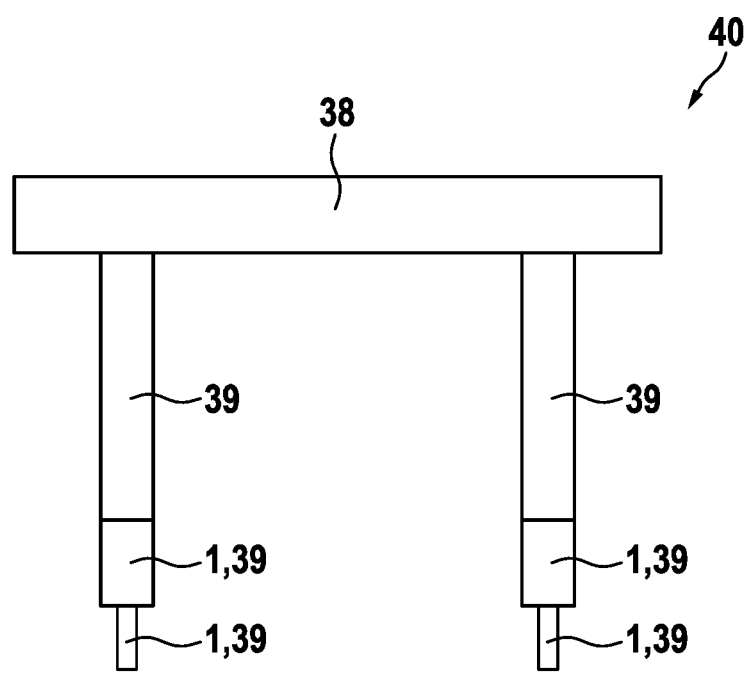
FIG. 11 is a side view of a table.

FIG. 11 shows a table 40 with a table top 38 and four table feet 39. A support device 1 is fixed to a lower end region of the four table feet 39. To change the height of the table 40, it is therefore only necessary to raise the table top 38 in the first rotational position of the second rod 3, so that the length of the table feet 39 can thereby be increased by moving the second rod 3 out of the first rod 2. By a further lifting of the table 40, so that the bottom elements 32 are no longer in contact with the floor and so that the second rod 3 is in an axial translation position with a maximum length of the support device 1, the second rod 3 can then be moved into the first rod 2 again for a minimum length of the table feet 39, so that once the minimum length of the table feet 39 has been reached, the length again step by step by locking the teeth 14 of the mating interlocking-connection element 13 to the fastening element 7 in the first rotational position of the second rod 3, the table feet 39 will be enlarged and can be used to reach a predetermined or necessary height of the table 40 and/or to compensate for uneven floors. In order to lock the second rod 3 into a predetermined axial translation position relative to the first rod 2, that is to say to achieve a predetermined length of the table foot 39, it is advantageously not necessary for any locking means to be actuated, for example a fastening screw. This is simply possible by changing the translation position of the second rod 3 relative to the first rod 2, that is to say by means of raising the table 40 and then lowering the table 40. In order to reach a predetermined height of the table 40, it is only necessary to reach the minimum length of the table foot 39 and afterwards the corresponding intended length of the table feet 39 can be set step by step during a motion of the second rod 3 out of the first rod 2, that is to say an increase in the length of the table foot 39.

In a further exemplary embodiment, not shown, of the table 40 with table feet 39, the support device 1 is built or integrated into the table feet 39 in such a way that the second rod 3 is at the top and the first rod 2 is at the bottom. The upper end of the second rod 3 is supported by a ball bearing on the table base 39 so that the rotational motion of the second rod 3 can be received by the ball bearing with respect to the non-rotating table base 39. Furthermore, the support device 1 is surrounded by a sleeve of the table base 39, so that the support device 1 is not visible from the outside and is protected against dust and is protected from mechanical damage by means of the sleeve.

Considered overall, significant advantages are reached with the support device 1 according to the invention and the table 40 according to the invention. A complex actuation of locking means for locking the length of the support device 1 is not necessary on the support device 1. Due to the mechanism 19, in the first rotational position of the second rod 3, a interlocking connection is carried out between the mating interlocking-connection element 13 and the fastening element 7 only in a second direction of motion of the second rod 3 and in a first direction of motion of the second rod 3 the axial translational motion of the second rod 3 is not blocked. In the second rotational position of the second rod 3, the second rod 3 can be moved in the axial translational motion relative to the second rod 3 in both directions of motion, without carrying out the interlocking connection between the mating interlocking-connection element 13 and the fastening element 7. Operating comfort can be significantly improved, because no complex and cumbersome actuation of locking means and disengagement of locking means is necessary. The support device 1 can be used in a wide variety of applications and in addition of being used, for example, at a table 40, the support device 1 can be used, for example, on bars of ladders to compensate for uneven floors. Furthermore, the support device 1 can also be used on stands of bicycles in an advantageous manner to change the length of the stand of a bicycle, so that a bicycle can be held securely with the stand even on uneven ground.

The invention claimed is:

1. A length adjustable support device, comprising
a first rod,
a second rod,
a bearing formed on the first rod for axially movably mounting the second rod on the first rod such that the second rod is movable in a translational motion relative to the first rod,
a movable fastening element for interlockingly axially fastening the movable second rod to the first rod by interlockingly fastening the fastening element to a mating interlocking-connection element,
the mating interlocking-connection element for the interlocking connection to the fastening element,
wherein
the length-adjustable support device comprises a mechanism and, because of the mechanism, the axial translation motion of the second rod causes an additional rotational motion of the second rod, the second rod thus being movable between a first rotational position and a second rotational position relative to the first rod by means of the axial translation motion of the second rod, the fastening element and the mating interlocking-connection element being in mechanical contact with each other in the first rotational position and the mechanical contact between the fastening element and the mating interlocking-connection element being released in the second rotational position and
wherein the fastening element is designed as a locking lug or a locking pin and teeth are formed on the mating interlocking-connection element for the interlocking connection of the teeth to the fastening element and the teeth are formed as locking elements.

2. The support device according to claim 1, wherein the geometry of the mating interlocking-connection element and/or the fastening element are designed such that, in the first rotational position of the second rod in a first direction of motion, the second rod is relative to the first rod axially movable as a translation motion and the axial translation motion of the second rod relative to the first rod is blocked in a second direction of motion due to the interlocking connection between the fastening element and the mating interlocking-connection element, whereby the first direction of motion and the second direction of motion are opposite to each other.

3. The support device according to claim 2, wherein the first direction of motion is a motion of the second rod out of the first rod, so that in the first direction of motion the length of the support device is increasable or vice versa and/or the bearing is designed as a slide bearing and/or the bearing is designed as an axial bore on the first rod.

4. The support device according to claim 1, wherein the mechanism is formed by a guide element and a guide groove and the guide element is at least partially arranged in the guide groove.

5. The support device according to claim 4, wherein the guide element is formed on the first rod and the guide groove is formed on the second rod or vice versa.

6. The support device according to claim 4, wherein the guide element is designed as a pin or a ball.

7. The support device according to claim 1, wherein the fastening element is pressed by an elastic element, in direction to the mating interlocking-connection element.

8. The support device according to claim 1, wherein the fastening element is formed and/or fastened on the second rod and the mating interlocking-connection element is formed and/or fastened on the first rod or the fastening element is formed and/or fastened on the first rod and the mating interlocking-connection element is formed and/or fastened on the second rod.

9. The support device according to claim 1, wherein the teeth are formed in the direction of the motion on a first side in the main perpendicular to the direction of motion of the second rod and are formed on a second side at an acute angle, to the direction of the motion and the first and second sides are opposite sides.

10. The support device according to claim 7, wherein the elastic element is a spring.

11. The support device according to claim 10, wherein the acute angle is between 20° and 70°.

12. The support device according to claim 10, wherein the fastening element is in the main formed on one side, perpendicular to the direction of motion of the second rod, so that by means of the laying of the side of the fastening element on the first side of the teeth, the axial motion of the second rod relative to the first rod is blocked in one direction of motion.

13. The support device according to claim 11, wherein the fastening element is formed on one side with a deviation of less than 30 degrees perpendicular to the direction of motion of the second rod.

14. A table, comprising
a table top,
several table feet attached to the table top,
wherein-on at least one table foot, a support device according to claim 1 is formed for a length adjustment of the at least one table foot.

15. The table according to claim 14, wherein on all table feet a support device according to claim 1 is formed for a length adjustment of all table feet.

16. A furnishing item, namely a chair, bench or cupboard, with feet wherein the furnishing item comprises at least one support device according to claim 1.

17. A machine, dishwasher or washing machine wherein the machine, dishwasher or washing machine comprises at least one support device according to claim 1.

* * * * *